United States Patent
Benthien et al.

(10) Patent No.: US 12,504,031 B2
(45) Date of Patent: Dec. 23, 2025

(54) FLEXIBLE CONNECTION ASSEMBLY WITH INTEGRATED VIBRATION DAMPER

(71) Applicant: Airbus Operations GmbH, Hamburg (DE)

(72) Inventors: Hermann Benthien, Hamburg (DE); Andreas Poppe, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 407 days.

(21) Appl. No.: 18/172,645

(22) Filed: Feb. 22, 2023

(65) Prior Publication Data
US 2023/0264802 A1 Aug. 24, 2023

(30) Foreign Application Priority Data
Feb. 24, 2022 (EP) .................................. 22158606

(51) Int. Cl.
*F16B 7/18* (2006.01)
*F16B 21/02* (2006.01)
(Continued)

(52) U.S. Cl.
CPC .............. *F16B 7/185* (2013.01); *F16B 21/02* (2013.01); *F16B 21/12* (2013.01); *F16B 21/16* (2013.01); *F16B 37/085* (2013.01)

(58) Field of Classification Search
CPC .......... F16B 7/185; F16B 21/02; F16B 21/12; F16B 21/16; F16B 37/085; Y10T 403/34; (Continued)

(56) References Cited

U.S. PATENT DOCUMENTS

| 752,025 | A | * | 2/1904 | Brindle | .................... F16B 39/06 |
| | | | | | 411/948 |
| 861,139 | A | * | 7/1907 | Newman | .................. F16B 39/32 |
| | | | | | 411/132 |

(Continued)

FOREIGN PATENT DOCUMENTS

| DE | 3148043 A1 | * | 6/1983 | ............ F16B 37/085 |
| DE | 102012110986 A1 | * | 5/2013 | ............ F16B 37/085 |

(Continued)

OTHER PUBLICATIONS

European Search Report for European Patent Application No. 22158606.8 dated Aug. 2, 2022; priority document.

*Primary Examiner* — Amber R Anderson
*Assistant Examiner* — Kevin J Baynes
(74) *Attorney, Agent, or Firm* — Greer, Burns & Crain, Ltd.

(57) ABSTRACT

A connection assembly for connecting a first element to a second element is provided. The connection assembly has a male element and a female element. The female element has a barrel nut. The barrel nut has a conical inner portion positioned at a first longitudinal region and a cylindrical inner portion positioned at a second longitudinal region. The barrel nut has a first engaging element portion and a first plain portion arranged alternatingly around a circumferential direction of the barrel nut. The male element has a cylindrical bolt-like shape and has a second engaging element portion and a second plain portion arranged alternatingly around a circumferential direction of the male element. The male element further has flattened sides at the second plain portion. The second engaging element portion of the male element is configured to engage with a respective one of the first engaging element portion of the barrel nut.

12 Claims, 4 Drawing Sheets

(51) Int. Cl.
*F16B 21/12* (2006.01)
*F16B 21/16* (2006.01)
*F16B 37/08* (2006.01)

(58) Field of Classification Search
CPC .............. Y10T 403/341; Y10T 403/342; Y10T 403/347; Y10T 403/7005; Y10T 403/7075
USPC ........ 403/316, 317, 319, 320, 353; 411/217, 411/321, 418, 437
See application file for complete search history.

(56) References Cited

U.S. PATENT DOCUMENTS

| | | | | |
|---|---|---|---|---|
| 1,017,770 | A * | 2/1912 | Latshaw | F16B 39/06 |
| | | | | 411/948 |
| 1,105,742 | A * | 8/1914 | Barger | F16B 39/06 |
| | | | | 411/948 |
| 1,133,860 | A * | 3/1915 | Herman | F16B 39/06 |
| | | | | 411/948 |
| 1,299,794 | A * | 4/1919 | Sheldon | F16B 39/32 |
| | | | | 411/945 |
| 1,329,609 | A * | 2/1920 | Kaddatz | G21C 13/06 |
| | | | | 411/944 |
| 1,369,002 | A * | 2/1921 | Bentz | F16B 39/06 |
| | | | | 411/944 |
| 2,728,344 | A * | 12/1955 | Dauenhauer | A01D 46/02 |
| | | | | 99/641 |
| 2,730,154 | A * | 1/1956 | Aspey | F16B 39/32 |
| | | | | 411/948 |
| 2,956,604 | A * | 10/1960 | John | F16B 39/06 |
| | | | | 411/948 |
| 5,324,297 | A | 6/1994 | Hood et al. | |
| 6,048,151 | A * | 4/2000 | Kwee | F16B 39/06 |
| | | | | 411/948 |
| 6,119,306 | A * | 9/2000 | Antonucci | E05F 5/022 |
| | | | | 24/297 |
| 7,118,303 | B2 * | 10/2006 | Doubler | F16B 35/005 |
| | | | | 411/75 |
| 7,682,120 | B1 * | 3/2010 | Goldbaum | F16B 39/122 |
| | | | | 411/553 |
| 8,142,127 | B1 * | 3/2012 | Doyle | F16B 37/0807 |
| | | | | 411/432 |
| 8,382,415 | B1 * | 2/2013 | Goldbaum | F16B 39/122 |
| | | | | 411/383 |
| 8,992,149 | B2 * | 3/2015 | Dixon | F16B 39/06 |
| | | | | 411/948 |
| 9,150,145 | B2 * | 10/2015 | Wandelt | B60Q 1/0433 |
| 9,642,236 | B2 | 5/2017 | Mather et al. | |
| 10,458,463 | B2 * | 10/2019 | Benthien | F16C 11/0661 |
| 10,533,597 | B2 | 1/2020 | Benthien et al. | |
| 11,021,225 | B2 * | 6/2021 | Benthien | F16B 7/20 |
| 2004/0105727 | A1 | 6/2004 | Jones | |
| 2017/0058959 | A1 * | 3/2017 | Benthien | F16C 11/06 |
| 2017/0130766 | A1 * | 5/2017 | Benthien | E04C 3/08 |

FOREIGN PATENT DOCUMENTS

| | | | | |
|---|---|---|---|---|
| EP | 3254951 B1 | 12/2017 | | |
| JP | H0768969 B2 | 7/1995 | | |
| KR | 20130128374 A | * 11/2013 | ............. | F16B 37/08 |
| WO | WO-2021005047 A1 | * 1/2021 | ............. | F16B 37/044 |

* cited by examiner

FLEXIBLE CONNECTION ASSEMBLY WITH INTEGRATED VIBRATION DAMPER

CROSS-REFERENCE TO RELATED APPLICATIONS

This application claims the benefit of the European patent application No. 22158606.8 filed on Feb. 24, 2022, the entire disclosures of which are incorporated herein by way of reference.

FIELD OF THE INVENTION

The present disclosure relates to connection assemblies for releasably joining two elements with each other in general, and in particular for aircraft applications. The disclosure also relates to a system having a plurality of such connection assemblies.

BACKGROUND OF THE INVENTION

Usually, when joining two elements, such as two rods or tubes, inner threads within the two elements are used which are joined by a bolt having outer threads. In applications where elongated elements are to be joined along a straight line, however, it is oftentimes necessary to adjust distances between the single elements, which is usually achieved by using washers and spacers to fix the threads in a certain position with regard to each other. To remove a single element of such a structure, the threads need to be fully unscrewed, which is time consuming and oftentimes requires specialized tooling.

In aircraft applications in particular, suspension structures are oftentimes used to mount certain equipment within the aircraft. Overhead compartments, for example, can be fixed to the fuselage of the aircraft by means of a truss structure which consists of multiple rods or tubes that are connected to each other in a certain pattern. The truss structure is fixed to primary components of the fuselage, such as to the frames or stringers. The overhead compartments may then be mounted onto the truss structure. Because of the truss structure and the large longitudinal extension of a passenger cabin, it is particularly important to be able to adjust distances between two tubes running along the longitudinal direction of the aircraft because otherwise a desirable flush mounting of the ceiling components may not be ensured.

Further, in order to be able to quickly and easily replace single tubes within the truss structure, for example for maintenance purposes, it is undesirable to have to unscrew regular threaded bolts because of the required time for such procedures. In order to account for manufacturing tolerances of the tubes and for keeping a flush arrangement, it may also be necessary to use different spacers during replacement, adding additional time delays and difficulties. The time needed for such procedures may be particularly disruptive when a component of the truss structure needs to be replaced in a relatively short time.

Also, because the truss structure is directly connected to primary components of the fuselage, mechanical vibrations from the fuselage are transferred into the structure and, therefore, into the components mounted onto the structure. In order to damp such vibrations, usually separate damper components are used to vibrationally isolate the components mounted onto the truss structure from the truss structure.

EP 3 254 951 B1 describes a fixation assembly for affixing a first object to and variably spaced from a second object. The fixation assembly comprises a male fastener and a female fastener. The male fastener comprises a bolt-shaped part having a circumferential outer surface, wherein the circumferential outer surface includes alternately at least one ridged section and at least one plain section. The female fastener comprises a circumferential inner surface including alternately at least one ridged section and at least one plain section. The male fastener is insertable into the female fastener in a state where it is at least one ridged section coincides with the at least one plain section of the female fastener, the respective ridges of the ridged sections of the male fastener and the female fastener engaging each other after relative rotation of the male fastener and the female fastener.

SUMMARY OF THE INVENTION

It is an objective to provide a connection assembly which allows for easy replacement of single elements within a larger structure of elements without the need to disassemble the whole structure. It is a further objective to provide such an assembly with integrated vibration damping capabilities.

This objective is solved by the subject matter of the independent claims. Further embodiments are described in the dependent claims as well as in the following description.

According to a first aspect, a connection assembly for connecting a first element to a second element is provided. The connection assembly comprises a male element and a female element. The female element comprises a barrel nut and the barrel nut comprises a conical inner portion positioned at a first longitudinal region and a cylindrical inner portion positioned at a second longitudinal region. The barrel nut comprises at least one first engaging element portion and at least one first plain portion arranged alternatingly around a circumferential direction of the barrel nut. The male element has a cylindrical bolt-like shape and comprises at least one second engaging element portion and at least one second plain portion arranged alternatingly around a circumferential direction of the male element. The male element further comprises flattened sides at the at least one second plain portion. Each of the at least one second engaging element portions of the male element is configured to engage with a respective one of the at least one first engaging element portion of the barrel nut.

Such a connection assembly may, for example, be useful to connect a first tube to a second tube, in particular in a straight line. However, other use cases are conceivable, too. For example, at an intersection point of two or more tubes, multiple of the male elements, as further described below, may project from a central element of the intersection point in different directions, and the corresponding female elements may be connected to or integrated into end sections of the tubes, so that a defined grid of tubes may be established using the connection assembly. However, the first element and the second element may also be any other component, that is to be joined to another component.

The barrel nut may, for example, be a bush-like element having a generally tubular form. The circumferential direction of the barrel nut may be described as the direction around the inner wall of the generally tubular form, i.e., the circular path along the inner wall of a tubular base of the barrel nut. At the inner surface of the barrel nut and around the circumferential direction are the first engaging element portions arranged in an alternating order with at least one first plain portion.

A plain portion in this sense, however, does not necessarily describe a planar portion without any curvature. The term "plain" refers to a portion where no protrusions or recesses, such as at the engaging element portions, are provided to engage with the male element. Preferably, the first plain portions have a curved but homogeneous surface.

The first plain portions and the first engaging element portions are separated and distinct along the circumferential direction of the barrel nut and extend each along a longitudinal axis of the generally tubular form of the barrel nut. The longitudinal axis of the barrel nut preferably is a symmetry axis that indicates a rotational symmetry.

The first longitudinal region and the second longitudinal region correspond to regions at different longitudinal positions or sections along the longitudinal axis of the generally tubular form of the barrel nut. The barrel nut comprises two opposite openings and the first longitudinal region is arranged at one of the openings while the other opening is arranged at the opposite opening. One of the openings may also be referred to as an insert opening, as described further below.

The conical inner portion corresponds to a portion of each of the first plain portions, which does not have a constant diameter but is tapered from the insert opening towards regions further inward of the barrel nut towards the cylindrical portion, so that the diameter of the conical inner portion becomes smaller when going further to the inside of the barrel nut. Preferably, the conical inner portion has a tapering shape only in regards of the plain portions of the first longitudinal region while the inner surface of the barrel nut does not taper where the first engaging element is located. For example, when the conical inner portion has two plain portions and two engaging element portions which are arranged opposite to each other, respectively, so that the respective plain portions are arranged opposite to one another and the respective engaging element portions are arranged opposite to one another, the distance between the plain portions increases when starting at the cylindrical portion and moving towards the insert opening while the radial distance between each of the engaging elements within an engaging element portion with respect to its corresponding engaging element of the opposite engaging element portion may be constant along the longitudinal direction of the conical region. For example, the cross section of the conical inner portion may be oval. This shape may be implemented by reducing the wall thickness of the barrel nut at the plain portions in a direction from the cylindrical portion towards the insert opening.

The cylindrical inner portion, on the other hand, does comprise a constant diameter over the full longitudinal length of the second longitudinal region.

In other words, each first plain portion extends along the full longitudinal length of the barrel nut but is limited in the circumferential direction to certain regions of the barrel nut. The first plain portions extend along the conical inner portion and the cylindrical inner portion along the longitudinal direction of the barrel nut, so that each first plain portion comprises a cylindrical inner portion and a conical inner portion.

The first engaging element portions may each comprise any suitable engaging structure to allow the second engaging element portions of the male element to come into engagement with it. For example, the first engaging element portions may comprise one or more grooves or protruding structures which allow corresponding structures of the male element to engage, such that the male element is connected to the female element, when the first engaging element portions and the second engaging element portions as in contact with each other. The first engaging element portions may for example also be inner thread portions of the barrel nut, which are interrupted by the first plain portions in the circumferential direction of the barrel nut. In contrast to the first plain portions, the smallest diameter of the engaging element portions may be constant over the full longitudinal length of the barrel nut, to allow the male element and the female element to be locked together in any relative longitudinal arrangement.

In particular, the engaging element portions may include multiple similar or identical and repeating structures along the longitudinal direction, so that the male element and the female element may be connected with each other in different longitudinal positions with respect to each other. This allows for length adjustments of the full assembled structure. For example, when two tubes are connected with each other, the full length of the assembly of the two tubes may be adjusted in that the male element may be inserted into the female element only for the desired length or at the desired relative position.

The number of the second engaging element portions of the male element may correspond to the number of first engaging element portions of the female element. Also, the number of first plain portions of the female element may be the same as the number of second plain portions of the male element.

The second engaging element portions of the male element are designed to match the first engaging element portions of the barrel nut and are, just as the first engaging element portions of the female element are separated by the first plain portions, separated by the second plain portions of the male element.

The second plain portions comprise flattened sides. The male element has a generally bolt-like shape, such as a screw, where the grooves or threads are separated by the second plain portions. In particular, a cross section of the male element may be that of a screw or screw-like element, where sides of the screw-like element have been cut off along the longitudinal direction.

For both the female element and the male element, the circumferential extensions of the engaging element portions are smaller or the same as the circumferential extensions of the plain portions. This allows for freely inserting the male element into the female element when the second plain portions of the male element face the first engaging element portions of the female element. The male element may be inserted into the female element as far as desired. Afterwards, the male element and the female element may be rotated with respect to each other, so that the first engaging element portions come into contact with the second engaging element portions, thereby connecting the male element and the female element and locking longitudinal movement of the male element with respect to the female element in the desired position.

The conical inner portion at the first longitudinal region allows for slightly tilting the male element with respect to the female element when the male element is not inserted up until the cylindrical portion. When the male element, however, is inserted up until the cylindrical portion, the cylindrical portion leads the male element with respect to the female element, so that both elements are aligned in a straight line, before bringing the engaging element portions into engagement. This avoids jamming of the engaging element portions while locking. The possibility to tilt the male element and the female element with respect to each other, on the other hand, allows for easy removal of a component, such as a tube in a truss structure, without having to disassemble the full structure. Such a tube may first be unlocked by rotating the female element with respect to the male element into the unlocked position, shifting the tube to one side, and simultaneously tilting and shifting the tube to the other side. The conical inner portion thereby allows slight tilting of the tube out of the straight position. The provision of the conical inner portion therefore allows for easy removal and replacement of the component from the assembled structure.

According to an embodiment, the connection assembly further comprises a clamp. The male element further comprises a first locking groove running along a longitudinal direction and arranged within one of the second engaging element portions. The barrel nut further comprises a second locking groove running along a longitudinal direction of the barrel nut and arranged within one of the first engaging element portions. The clamp is configured to engage with the first locking groove and the second locking groove, when the male element is connected to the female element, thereby locking rotational movement of the male element with respect to the female element.

The first locking groove and the second locking groove may both be recesses formed within at least one of the first engaging element portions and the second engaging element portions, respectively. The locking grooves may for example be formed as elongated grooves arranged in the center (with respect to the circumferential direction of the female element and the male element) of the corresponding engaging element portion and running along the full longitudinal extension of the female element and the male element. In particular, the locking grooves are dimensioned to receive the clamp. When the male element is inserted into the female element and when both elements are in the locked position, the first locking groove and the second locking groove are aligned with each other and build a common longitudinal channel to receive the clamp. By inserting the clamp into this channel, rotational movement of the male element with respect to the female element is blocked because the engaging element portions cannot move rotationally anymore. This avoids inadvertently releasing the connection assembly, e.g., by vibrations or other external disturbances.

According to another embodiment, an inner diameter of the cylindrical inner portion of the female element at the first plain portions is the same in size as an outer diameter of the second engaging element portions of the male element.

As described above, the cylindrical inner portion builds a tubular section in the inside of the barrel nut with acts to align the male element with the female element in a straight. By dimensioning the outer diameter of the second engaging element portions in the same size as the inner diameter of the cylindrical inner portion, the male element can only move in the longitudinal direction once inserted into the cylindrical inner portion, such as is the case with a dowel pin.

However, it may also be conceivable to dimension the outer diameter of the second engaging element portions slightly smaller, to facilitate rotational movement of the male element with respect to the female element during assembly of the elements to be connected with the connection assembly.

According to another embodiment, the female element comprises an insert opening. The conical inner portion is arranged immediately at the insert opening. The cylindrical inner portion is arranged adjacent the conical inner portion opposite the insert opening, such that the conical inner portion is arranged between the insert opening and the cylindrical inner portion.

As already described above, the barrel nut has two openings at the sides. The barrel nut may for example be mounted inside a side end of a tube to be connected, such that one of the two openings faces the opening of the tube and flushes with the face of the tube. This opening is defined as the insert opening. The male element may be inserted into the female element at the insert opening. When the male element is not fully inserted into the barrel nut, in particular not inserted as far as to contact the cylindrical inner portion, the conical inner portion allows for slight tilting of the male element with respect to the female element. In particular, the further the male element is removed from the female element, the more tilting is possible because of the conical structure of the conical inner portion. Therefore, when simultaneously shifting and tilting, e.g., such a tube, it may be easily removed from the full structure.

According to another embodiment, an inner diameter of the conical inner portion at the insert opening is larger than an inner diameter of the conical inner portion at the cylindrical inner portion, such that the diameter of the conical inner portion is tapered from the insert opening in the direction of the cylindrical inner portion.

Therefore, the diameter of the conical inner portion approaches the diameter of the cylindrical inner portion when going further inside the barrel nut.

According to another embodiment, the conical inner portion merges directly into the cylindrical inner portion.

According to another embodiment, each one of the at least one first engaging element portion has at least one groove, wherein the at least one groove runs along the circumferential direction of the barrel nut. Each one of the at least one second engaging element portion has at least one engaging member that is configured to engage with the at least one groove of the at least one first engaging element portion.

The grooves in the first engaging element portions may, for example, be recesses in the engaging element portions that run along the circumferential direction. In particular, the grooves may run at a fixed longitudinal position around the circumferential direction. If more than one groove is employed, recesses and protrusions alternate with each other along the longitudinal direction.

The engaging members of the second engaging element portions are designed to correspond with the grooves of the first engaging element portions. Therefore, the second engaging element portions of the male element may have protrusions which correspond to grooves of the first engaging element portions, such that the protrusions fit into the grooves. Therefore, when rotated with respect to each other after insertion, longitudinal movement of the male element with respect to the female element is blocked.

According to another embodiment, each one of the at least one first engaging element portion includes multiple thread-like grooves.

Such thread like grooves may be similar to the threads of a screw and may in particular comprise a screw-like pitch, so that the grooves are twisted along the longitudinal direction. This introduces a tension into the first engaging element portions and the second engaging element portions, when the male element is rotated with regard to the female element while bringing them into the locked position after insertion of the male element. This further secures the male and female elements with each other. In particular, inadvertently rotating the male element with regard to the female element into the unlocked position is avoided.

According to another embodiment, a tapering angle of the conical inner portion is dimensioned to allow a tilting of the male element with regard to the female element between 2 degree and 7 degree when the male element is inserted in the conical inner portion.

Such a tilting angle may allow to tilt an element in a greater structure, e.g., a tube in a truss structure, far enough out of the straight line in order to remove the element without having to disassemble the full structure. Usually, in such structures, the tube is mounted between fixes connection points, which may each employ a male element of the connection assembly. In order to remove a single tube from the structure, the tube may be unlocked by rotation, a described above, shifted towards one of the male elements, and then simultaneously tilted and shifted towards the opposite male element.

However, other tilting angles may also be implemented, depending on the desired application. In particular, when using the connection assembly to connect rods or tubes, the shorter the tubes, the bigger the tilting angle must be, as will be readily apparent to one of ordinary skill in the art.

According to another embodiment, the barrel nut comprises two first engaging element portions spaced from each other by 180 degrees about the circumferential direction of the barrel nut. The male element comprises two second engaging element portions spaced from each other by 180 degrees about the circumferential direction of the male element.

The male element and the female element are configured to be connected by inserting the male element into the female element and turning both elements by 90 degrees around a common longitudinal axis.

By employing two first engaging element portions and two second engaging element portions spaced by 180 degrees, the circumference of the male element and of the female element each are divided into four regularly arranged sections, two plain portions and two engaging element portions. The male element may be inserted into the female element, such that the second engaging element portions of the male element each face a corresponding plain portion between the first engaging element portions of the female element. By turning the female element and the male element by a ¼ rotation, i.e., by 90 degrees, the engaging element portions of the male element and the female elements come into engagement and lock the male element to the female element.

Other amounts of engaging element portions are also conceivable. For example, the female element and the male element may employ multiples of two engaging element portions, such as four, eight, etc., engaging element portions. If, for example, four engaging element portions are employed, rotation of 45 degrees locks the male element to the female element, and so on.

According to another embodiment, the female element further comprises a shock absorbing element and the shock absorbing element surrounds the barrel nut around its outer circumferential direction.

As described above, the female element is a bush-like element which has a circular outer diameter. The shock absorbing element may be a shell or envelop made from a flexible material that is wrapped around the barrel nut and encloses the barrel nut. Therefore, when the female element is inserted into, e.g., a tube or other element that is to be connected to a second element, the shock absorbing element connects the barrel nut with the tube or other element. Therefore, vibrational loads coupled into the barrel nut, for example via a male element from a junction point of a truss structure, are absorbed by the shock absorbing element and isolated from the tube or other element. Hence, vibrations, e.g., from a fuselage, are not propagated into the truss structure or other structure, avoiding vibrations and other mechanical loads, e.g., in an overhead compartment.

According to another embodiment, the shock absorbing element is made from a rubber material.

According to another aspect, as system is provided. The system comprises a first element, a second element, a first connection assembly, and a second connection assembly. The first connection assembly and the second connection assembly may be designed according to any one of the embodiments described above. The first element is a first tube, and the second element is a second tube. The female element of the first connection assembly is dimensioned to match the inner diameter of the first tube and is arranged within an end section of the first tube. The female element of the second connection assembly is dimensioned to match the inner diameter of the second tube and is arranged within an end section of the second tube. The male elements of the first connection assembly and the second connection assembly are joined with each other so as to project in opposite directions.

The male elements of the first and second connection assemblies may, for example, be connected to each other such that the project 180 degree from each other in opposite directions. The female elements of the first connection assembly and the second connection assembly are arranged inside end sections of the first tube and the second tube, respectively, such that the insert opening, as described above, are flush with the opening of the end sections of the tubes. The first and second male elements may for example be joined at a junction point of a truss structure, so as to allow two tubes to be connected to the junction point in the manner described above with regard to the connection assembly.

The male element of the first connection assembly and the male element of the second connection assembly may, however, also projection from each other in angles different from 180 degrees, so that a desired grid of tubes may be established, for example, in order to build a truss structure for an aircraft.

If the male elements of the first connection assembly and the second connection assembly project by 180 degrees from each other, they connect the first tube and the second tube with each other in a straight line, when locked with the female elements of the first connection assembly and the second connection assembly, respectively.

In summary, the present disclosure provides a connection assembly for connecting a first element to a second element. The connection assembly may, for example, be employed to connect single tubes of a truss structure within an aircraft and provides for easy removal and replacement of single tubes of such a truss structure, without the need for specialized tooling, thereby reducing maintenance time. The connection assembly further provides integrated shock absorbing capabilities, so that vibrational loads from a surrounding structure, such as the aircraft fuselage, are absorbed and not transferred to the tubes of the truss structure.

Although the present disclosure is described with regard to aircraft applications, it should be appreciated that the disclosed connection assembly may be applied to any suitable application, such as other vehicle applications (trains, cars, trucks, etc.) or for applications in buildings, as will be readily apparent to one of ordinary skill in the art.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION OF THE PREFERRED EMBODIMENTS

Figure 1:
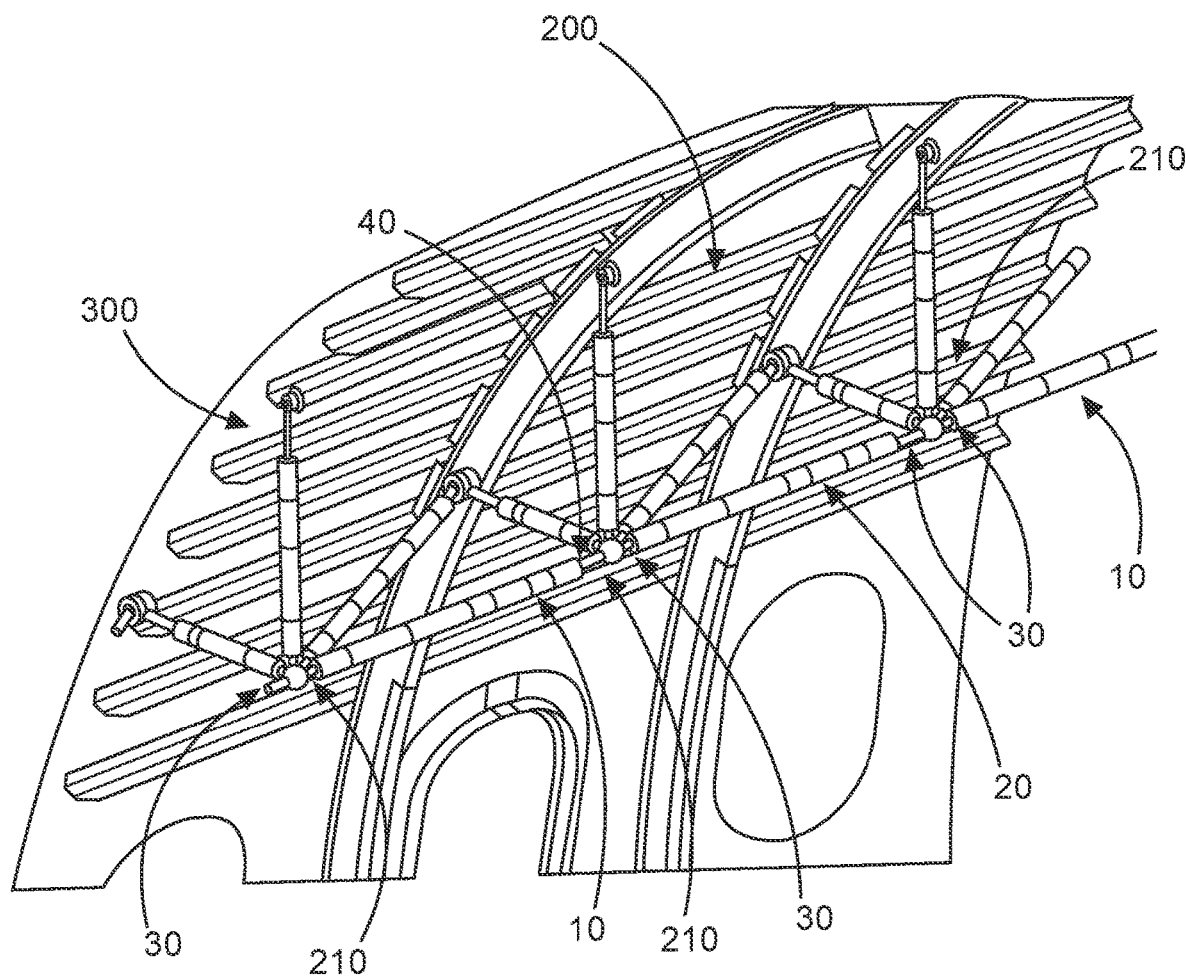
FIG. 1 is a schematic overview of a truss structure employing multiple connection assemblies.

FIG. 1 schematically shows a truss structure 200 within an aircraft fuselage 300. The truss structure 200 comprises multiple first tubes 10 and second tubes 20 which are connected by means of multiple connection assemblies 100 according to the present disclosure. Male elements 30 of the multiple connection assemblies 100 are integrally connected to multiple junction points 210. In FIG. 1, two first tubes 10 are connected to a second tube 20. The second tube 20 is arranged between two junction points 210 which connect the tubes 10, 20 and between two first tubes 10. Each of the tubes 10, 20 comprises a female element 40 (see FIGS. 3 to 5, not shown in FIG. 1) inside each end section of the tubes 10, 20. The connection assemblies 100 allow for easy removal and replacement of single tubes 10, 20 from the truss structure 200, e.g., for maintenance work without the need for specialized tooling, as will be described with regard to FIGS. 2 to 5. Further, the connection assemblies provide integrated shock absorbing capabilities, as also described below.

Figure 2:
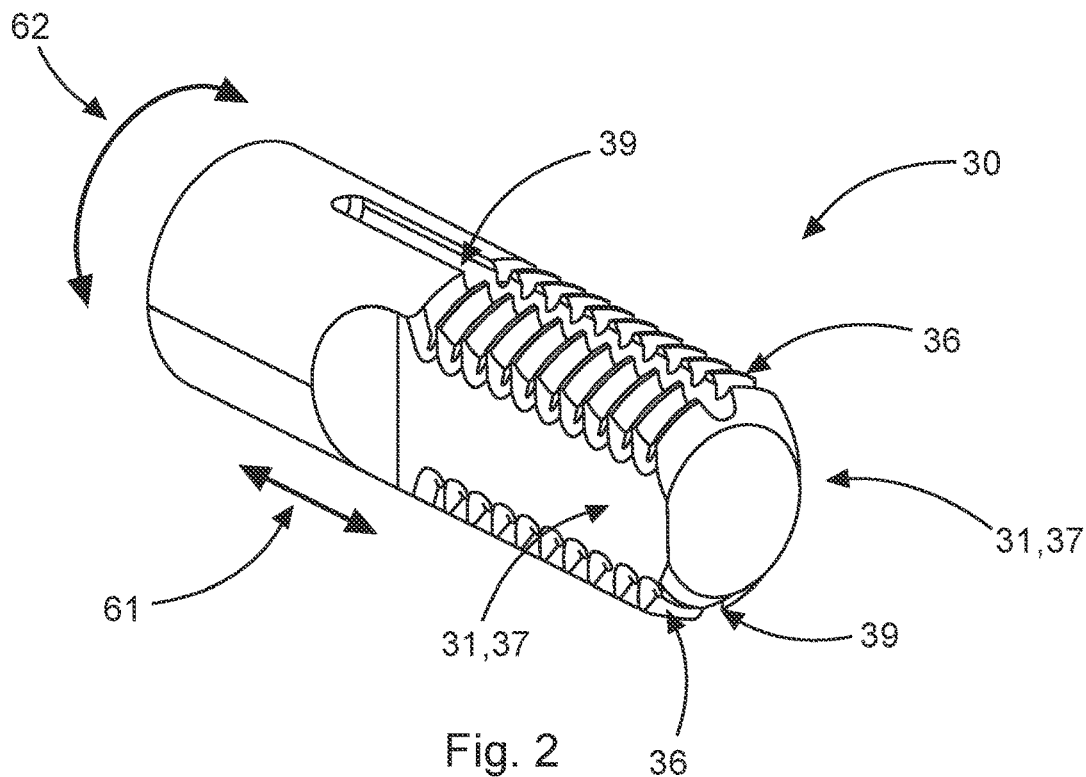
FIG. 2 is a schematic view of a male element of a connection assembly.

FIG. 2 shows a male element 30 of the connection assembly 100 of FIG. 1. The male element 30 has a generally bolt-like shape and extends in a longitudinal direction 61. The male element 30 comprises two second engaging element portions 36 and two second plain portions 37. The second plain portions 37 and the second engaging element portions 36 are arranged around a circumferential direction 62 in an alternating order. Although shown as extending only over a part of the longitudinal direction 61, the second engaging element portions 36 and the second plain portions 37 may also extend over the full length of the male element 30. The male element 30 further comprises two first locking grooves 39.

The second plain portions 37 are designed as flattened sides 31, such as is the case with a flat bolt. The second engaging element portions 36 are illustrated as being a plurality of grooves along the longitudinal direction 61. However, it should be appreciated that the second engaging element portions may be any suitable structure for connecting the second engaging element portions 36 with corresponding first engaging element portions 46 (FIG. 2). For example, the second engaging element portions 36 may also be thread-like structures having a pitch, such as with a screw thread. The second engaging element portions 36 may also comprise one or more pins, such as with a bayonet locking mechanism.

The first locking grooves 39 run along the longitudinal direction 61 in the center of each second engaging element portion 36. The first locking grooves 39 may be designed to receive a clamp 50 (FIG. 4) to lock circumferential movement of the male element 30 with respect to the female element 40 (FIG. 3), as will be described further below.

Figure 3:
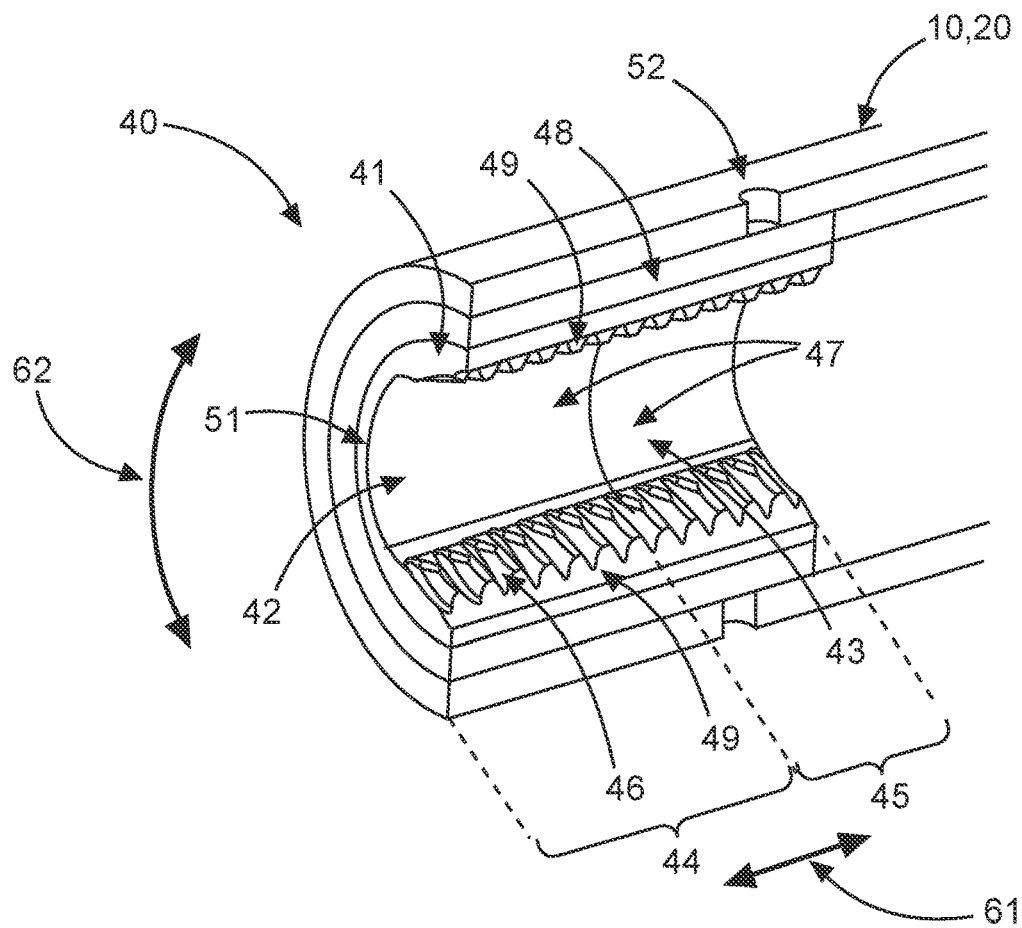
FIG. 3 is a schematic detailed cut-view of a female element of a connection assembly.

FIG. 3 shows a detailed cut-view of a female element 40 of the connection assembly 100 of FIG. 1 which is mounted inside a first or second tube 10, 20. The female element 40 is configured to be connected to the male element 30 of FIG. 2 and comprises a barrel nut 41 and a shock absorbing element 48. The shock absorbing element 48 surrounds the barrel nut 41 and connects it to the tube 10, 20. The tube 10, 20 comprises a clamp hole 52 for fixing a clamp 50 (FIG. 4), which will be described further below.

The barrel nut 41 has a generally tubular form and comprises an insert opening 51, which is flush with an opening of the tube 10, 20. The barrel nut 41 further comprises two first engaging element portions 46 and two first plain portions 47 (only one shown, FIG. 2 shows a symmetric cut-view of the female element 40) which are arranged around the circumferential direction 62 in an alternating order. Further, the barrel nut 40 comprises two second locking grooves 49 which are running along the longitudinal direction 61 inside the first engaging element portions 46. The second locking grooves 49 are designed to build a common channel for a clamp 50 (FIG. 4) to lock circumferential movement of the female element 40 with respect to the male element 30 when the female element 40 and the male element 30 are rotated into the locked position.

The first engaging element portions 46 are designed complementary to the second engaging element portions 36 of the male element of FIG. 2. In particular, the first engaging element portions 46 extend along the longitudinal direction 61 over the full length of the barrel nut 41 and comprise a multitude of protrusions, which are designed to engage with the grooves of the second engaging element portions 36 of FIG. 1. The smallest diameter of the barrel nut 41, i.e., the distance between two opposite protrusions of the first engaging element portions 46, is constant over the full length of the barrel nut 41 along the longitudinal direction 61.

The first plain portions 47 also extend over the full length of the barrel nut 41 along the longitudinal direction 61 and each comprise a conical inner portion 42 and a cylindrical inner portion 43. The conical inner portion 42 is arranged immediately at the insert opening 51 in a first longitudinal region 44. The cylindrical inner portion 43 is arranged adjacent the conical inner portion 42 in a second longitudinal region 45.

The cylindrical inner portion 43 has a constant diameter over the full extension of the cylindrical inner portion along the longitudinal direction 61. The conical inner portion 42, however, has a conical shape having a larger diameter at the insert opening 51 than at the transition to the cylindrical inner portion 43. The inner diameter of the barrel nut 41 at the cylindrical inner portion 43 is substantially the same as the outer diameter of the second engaging element portions 36 of the male element 30.

When connecting the male element 30 with the female element 40, the male element 30 is first inserted into the barrel nut 41 such that the second engaging element portions 36 are facing the first plain portions 47. The conical shape of the conical inner portion 42 allows the male element 30 to tilt out of the longitudinal direction 61 with respect to the barrel nut 41. Because of the substantially same diameter of the second engaging element 36 and the cylindrical inner portion 43, when the male element 30 is inserted far enough to reach the cylindrical inner portion 43, the male element 30 and the female element 40 are aligned along the longitudinal direction 61. The male element 30 may then be connected with the female element 40 by rotating the female element 40 around the longitudinal direction 61 with respect to the male element 30. This brings the first engaging element portions 46 and the second engaging element portions 36 in engagement and locks further longitudinal movement of the male element 30 with respect to the female element 40.

Aligning the male element 30 and the female element 40 by means of the cylindrical inner portion 43 helps to avoid jamming of the engaging elements 36, 46. On the other hand, allowing the male element 30 to tilt out of the longitudinal alignment when the male element 30 is only inserted into the conical inner portion 42 but not into the cylindrical inner portion 43 allows to easily remove and replace a tube 10, 20 from a truss structure 200 (FIG. 1), without having to disassemble the full truss structure 200.

The shock absorbing element 48 is made from a flexible material, such as a rubber material, that absorbs vibrational loads transmitted between the connection assembly 100 and the tube 10, 20.

Figure 4:
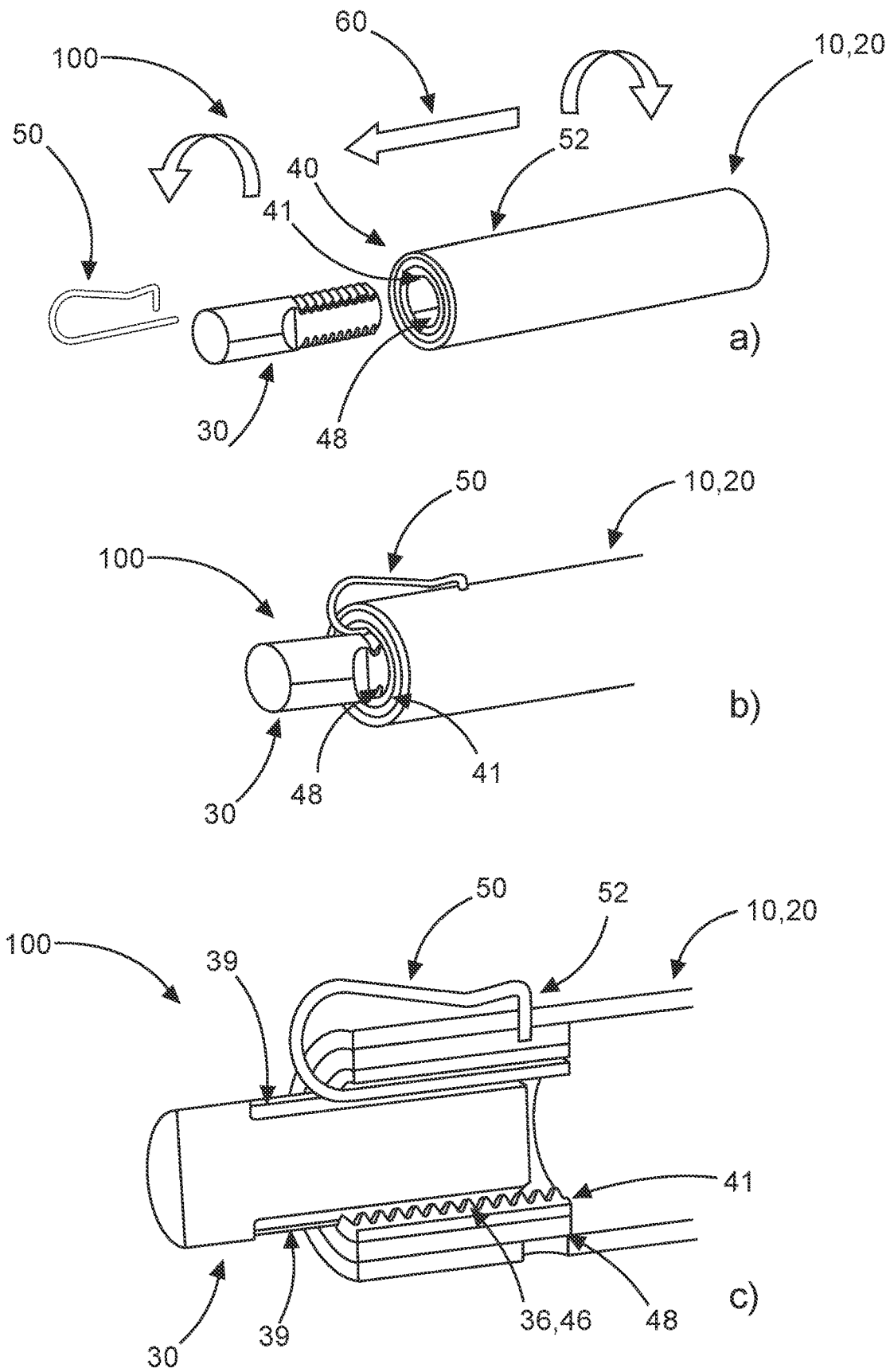
FIG. 4 is schematic views of a connection assembly in an a) opened state, b) closed state, and c) a closed state in a cut view.

FIG. 4 shows the connection assembly 100 in three different states. FIG. 4a shows the connection assembly 100 in an aligned but open state. The sequence of connecting the male element 30 with the female element 40 is indicated by the arrows on top of FIG. 4a: first, the tube 10, 20 (together with the female element 40) is rotated by 90 degree around the longitudinal axis 60, such that the second engaging element portions 36 of the male element 30 are facing the first plain portions 47 of the female element 40; then, the tube 10, 20 is shifted in the direction of the male element 30 along the longitudinal axis 60 until the male element 30 has been inserted into female element 40 as desired; then, the tube 10, 20 is rotated back into the original position, so that the engaging element portions 36, 46 come into engagement and the first locking groove 39 and the second locking groove 49 are aligned and build a common channel for the clamp 50; finally, the clamp 50 is inserted into the common channel and locked in place with the clamp hole 52, to lock circumferential movement of the female element 40 with respect to the male element 30.

FIG. 4b shows the connection assembly 100 in the assembled state after the procedure described above with regard to FIG. 4a.

FIG. 4c shows the assembled connection assembly 100 of FIG. 4b in a cut view along the longitudinal axis 60. Here, the interlocking of the engaging element portions 36, 46 as well as the arrangement of the clamp 50 within the locking grooves 39, 49 is clearly visible.

Figure 5:
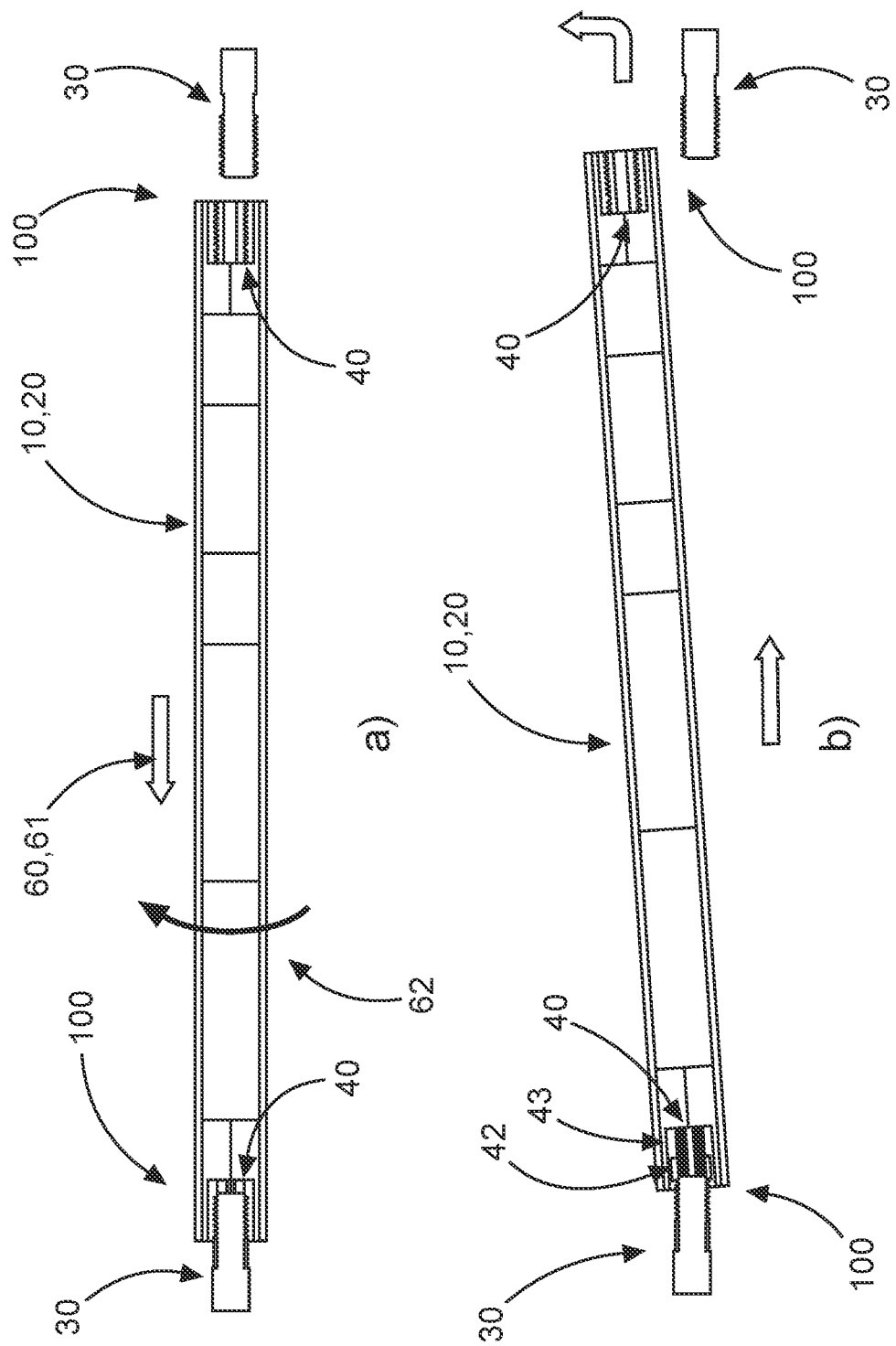
FIG. 5 is schematic views illustrating the removal of a tube arranged between two junction points of a truss structure.

FIG. 5 shows a tube 10, 20 which is mounted between two fixed mounting points (male elements 30 fixed in place, as is shown in FIG. 1) during a removal procedure.

In a first step, shown in FIG. 5a, the tube 10, 20 is rotated by 90 degrees around the longitudinal axis 60 (or along the circumferential direction 62), in order to unlock the engaging element portions 36, 46. It should be appreciated that the clamp 50 (not shown in FIG. 5) has been removed first. After that, the tube 10, 20 is shifted towards one of the male elements 30 (to the left in FIG. 5a) until the opposite end is free from the other male element 30.

Next, as shown in FIG. 5b, the tube 10, 20 is simultaneously shifted towards the free male element 30 (to the right side in FIG. 5b) and tilted out of the longitudinal axis 60. This tilting is possible because of the conical inner portion 42, as described above. By shifting the tube 10, 20 to the right, the left male element 30 at some point no more is inside the cylindrical inner portion 43 but only inside the conical inner portion 42, which allows tilting of the tube 10, 20 with regard to the male element 30. Reassembling, for example with a new tube 10, 20, may take place in the same way but in the opposite order. This procedure does not need any specialized tooling and can be done in a very time efficient manner. Further, the integrated shock absorbing element 48 avoids the need for separate shock absorbing structures.

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 first element, first tube
20 second element, second tube
30 male element
31 flattened sides
36 second engaging element portions
37 second plain portions
39 first locking groove
40 female element
41 barrel nut
42 conical inner portion
43 cylindrical inner portion
44 first longitudinal region
45 second longitudinal region
46 first engaging element portions
47 first plain portions
48 shock absorbing element
49 second locking groove
50 clamp
51 insert opening
52 clamp hole
60 longitudinal axis
61 longitudinal direction
62 circumferential direction
100 connection assembly
200 truss structure
210 junction points
300 aircraft fuselage

The invention claimed is:
1. A connection assembly for connecting a first element to a second element, the connection assembly comprising:
a male element; and
a female element;
wherein the female element comprises a barrel nut, wherein the barrel nut comprises a conical inner portion positioned at a first longitudinal region and a cylindrical inner portion positioned at a second longitudinal region, wherein the barrel nut comprises at least one first engaging element portion and at least one first plain portion arranged alternatingly around a circumferential direction of the barrel nut, wherein the male element has a cylindrical bolt-like shape and comprises at least one second engaging element portion and at least one second plain portion arranged alternatingly around a circumferential direction of the male element, wherein the male element further comprises flattened sides at the at least one second plain portion, wherein each of the at least one second engaging element portions of the male element is configured to engage with a respective one of the at least one first engaging element portion of the barrel nut, wherein the female element further comprises a shock absorbing element, and wherein the shock absorbing element surrounds the barrel nut around its outer circumferential direction.

2. The connection assembly of claim 1, further comprising:

a clamp, wherein the male element further comprises a first locking groove running along a longitudinal direction and arranged within one of the second engaging element portions, wherein the barrel nut further comprises a second locking groove running along a longitudinal direction of the barrel nut and arranged within one of the first engaging element portions, and wherein the clamp is configured to engage with the first locking groove and the second locking groove, when the male element is connected to the female element, thereby locking rotational movement of the male element with respect to the female element.

3. The connection assembly of claim 2, wherein an inner diameter of the cylindrical inner portion of the female element at the at least one first plain portion is the same in size as an outer diameter of the at least one second engaging element portion of the male element.

4. The connection assembly of claim 3, wherein the female element comprises an insert opening;

wherein the conical inner portion is arranged immediately at the insert opening, and wherein the cylindrical inner portion is arranged adjacent the conical inner portion opposite the insert opening, such that the conical inner portion is arranged between the insert opening and the cylindrical inner portion.

5. The connection assembly of claim 4, wherein an inner diameter of the conical inner portion at the insert opening is larger than an inner diameter of the conical inner portion at the cylindrical inner portion, such that the diameter of the conical inner portion is tapered from the insert opening in the direction of the cylindrical inner portion.

6. The connection assembly of claim 5, wherein the conical inner portion merges directly into the cylindrical inner portion.

7. The connection assembly of claim 6, wherein each one of the at least one first engaging element portion has at least one groove, wherein the at least one groove runs along the circumferential direction of the barrel nut, and wherein each one of the at least one second engaging element portion has at least one engaging member that is configured to engage with the at least one groove of the at least one first engaging element portion.

8. The connection assembly of claim 7, wherein each one of the at least one first engaging element portion includes multiple thread-like grooves.

9. The connection assembly of claim 8, wherein a tapering angle of the conical inner portion is dimensioned to allow a tilting of the male element with regard to the female element between 2 degrees and 7 degrees when the male element is inserted in the conical inner portion.

10. The connection assembly of claim 9, wherein the at least one first engaging element portion of the barrel nut is defined by two first engaging element portions spaced from each other by 180 degrees about the circumferential direction of the barrel nut, wherein the at least one second engaging element portion of the male element is defined by two engaging element portions spaced from each other by 180 degrees about the circumferential direction of the male element, and wherein the male element and the female element are configured to be connected by inserting the male element into the female element and turning the male and female elements by 90 degrees in relation to each other around a common longitudinal axis.

11. The connection assembly of claim 1, wherein the shock absorbing element is made from a rubber material.

12. A system, comprising:

a first element;

a second element; and a first connection assembly and a second connection assembly, the first connection assembly and the second connection assembly defined by the connection assembly according to claim 11, wherein the first element is a first tube and the second element is a second tube;

wherein the female element of the first connection assembly is dimensioned to match the inner diameter of the first tube and is arranged in an end section of the first tube, wherein the female element of the second connection assembly is dimensioned to match the inner diameter of the second tube and is arranged in an end section of the second tube, and wherein the male elements of the first connection assembly and the second connection assembly are joined with each other so as to project in opposite directions.

* * * * *